(12) United States Patent
Miura

(10) Patent No.: US 11,014,809 B2
(45) Date of Patent: May 25, 2021

(54) TRANSPORTATION DEVICE EQUIPPED WITH FUEL CELL SYSTEM

(71) Applicant: SAWAFUJI ELECTRIC CO., LTD., Gunma (JP)

(72) Inventor: Tomonori Miura, Gunma (JP)

(73) Assignee: SAWAFUJI ELECTRIC CO., LTD., Gunma (JP)

(*) Notice: Subject to any disclaimer, the term of this patent is extended or adjusted under 35 U.S.C. 154(b) by 68 days.

(21) Appl. No.: 16/481,057

(22) PCT Filed: Feb. 28, 2018

(86) PCT No.: PCT/JP2018/007391
§ 371 (c)(1),
(2) Date: Jul. 25, 2019

(87) PCT Pub. No.: WO2018/168450
PCT Pub. Date: Sep. 20, 2018

(65) Prior Publication Data
US 2019/0393523 A1   Dec. 26, 2019

(30) Foreign Application Priority Data

Mar. 17, 2017  (JP) .............................. JP2017-052642

(51) Int. Cl.
*C01B 3/04* (2006.01)
*H01M 8/04225* (2016.01)
(Continued)

(52) U.S. Cl.
CPC ................ *C01B 3/04* (2013.01); *B01D 53/22* (2013.01); *B60L 50/75* (2019.02); *C01B 3/047* (2013.01);
(Continued)

(58) Field of Classification Search
CPC ........... C01B 3/04; C01B 3/047; C01B 3/501; H01M 8/04225; H01M 8/04302;
(Continued)

(56) References Cited

U.S. PATENT DOCUMENTS 10,065,170 B2  9/2018  Kambara
2015/0238922 A1  8/2015  Kambara
(Continued)

FOREIGN PATENT DOCUMENTS

CN    104661955    5/2015
JP    2012-038559  2/2012
(Continued)

*Primary Examiner* — Hal Kaplan
(74) *Attorney, Agent, or Firm* — Wells St. John P.S.

(57) ABSTRACT

Provided is a transportation device which is capable of continuously travelling without being supplied with hydrogen from the outside. According to the present invention, a transportation device is provided with an ammonia storage means, a hydrogen production device, a fuel cell, a motor, a battery and a control unit. The hydrogen production device produces hydrogen by decomposing ammonia; and the fuel cell is supplied with hydrogen from the hydrogen production device and generates electric power. The motor operates by being supplied with some or all of the electric power generated by the fuel cell. The battery is supplied with some or all of the electric power generated by the fuel cell, and supplies electric power to the motor and the hydrogen production device.

7 Claims, 5 Drawing Sheets

(51) Int. Cl.
| | | |
|---|---|---|
| *H01M 8/04302* | (2016.01) | |
| *B01D 53/22* | (2006.01) | |
| *H01M 8/04537* | (2016.01) | |
| *H01M 8/04858* | (2016.01) | |
| *H01M 8/0606* | (2016.01) | |
| *H01M 16/00* | (2006.01) | |
| *B60L 50/75* | (2019.01) | |
| *B60L 50/72* | (2019.01) | |
| *B60L 58/40* | (2019.01) | |
| *B60H 1/00* | (2006.01) | |
| *C01B 3/50* | (2006.01) | |
| *H01M 8/0662* | (2016.01) | |
| *H01M 8/1018* | (2016.01) | |

(52) U.S. Cl.
CPC ......... *C01B 3/501* (2013.01); *H01M 8/04225* (2016.02); *H01M 8/04302* (2016.02); *H01M 8/04626* (2013.01); *H01M 8/04932* (2013.01); *H01M 8/0606* (2013.01); *H01M 8/0687* (2013.01); *H01M 16/006* (2013.01); *B60H 1/00385* (2013.01); *B60L 50/72* (2019.02); *B60L 58/40* (2019.02); *B60Y 2400/202* (2013.01); *H01M 2008/1095* (2013.01); *H01M 2220/20* (2013.01); *H01M 2250/20* (2013.01)

(58) Field of Classification Search
CPC ......... H01M 8/04626; H01M 8/04932; H01M 8/0606; H01M 8/0687; H01M 16/006; H01M 2008/1095; H01M 2220/20; H01M 2250/20; B60L 50/72; B60L 50/75; B60L 58/40; B01D 53/22; B60H 1/00385; B06Y 2400/202
USPC .................................................. 307/9.1, 10.1
See application file for complete search history.

(56)  References Cited

U.S. PATENT DOCUMENTS

| | | | |
|---|---|---|---|
| 2015/0344302 A1* | 12/2015 | David | C01B 21/0923 423/648.1 |
| 2016/0053651 A1* | 2/2016 | Dementhon | F01N 3/2066 60/274 |
| 2018/0009661 A1 | 1/2018 | Kambara | |

FOREIGN PATENT DOCUMENTS

| | | |
|---|---|---|
| JP | 2013-105706 | 5/2013 |
| JP | 2014-070012 | 4/2014 |
| JP | 2016-034881 | 3/2016 |
| WO | WO2014/054277 A1 | 4/2014 |
| WO | WO2016/132842 | 8/2016 |

* cited by examiner

TRANSPORTATION DEVICE EQUIPPED WITH FUEL CELL SYSTEM

CROSS REFERENCE TO RELATED APPLICATION

This is a 35 U.S.C. § 371 application of, and claims priority to, International Application No. PCT/JP2018/007391, filed on Feb. 28, 2018, which was published as WO 2018/168450 on Sep. 20, 2018, and which claims priority to JP Patent Application No. 2017-052642, which was filed on Mar. 17, 2017, the teachings of which are incorporated herein by reference.

FIELD OF THE INVENTION

The present invention relates to transportation devices equipped with fuel cell systems, and particularly relates to a transportation device equipped with a hydrogen production device using ammonia as raw material and a fuel cell, the transportation device being capable of continuously travelling without being supplied with hydrogen from the outside.

DESCRIPTION OF THE RELATED ART

Practical applications of transportation devices equipped with fuel cells include fuel cell vehicles. Fuel cell vehicles operate by generating electricity in the fuel cell using hydrogen as fuel to drive the motor with the generated electric power. Common fuel cell vehicles are equipped with hydrogen tanks capable of storing hydrogen in a highly pressurized state, and are supplied with hydrogen at dedicated hydrogen stations. Hydrogen tanks currently installed in fuel cell vehicles are pressure vessels capable of a pressure of 70 MPa. Hydrogen tanks and the various control means for safety purposes are more expensive than equipment for ordinary fuel tanks. This expensive equipment is one factor that makes fuel cell vehicles more expensive than transportation devices in general.

The hydrogen supplied to fuel cell vehicles at hydrogen stations is mostly made at a separate location and then transported in the form of liquid hydrogen or compressed gas to the hydrogen station, where it is stored temporarily. Means for transporting hydrogen, and installing hydrogen stations, require great costs. For example, when transporting hydrogen in the form of liquid hydrogen, the volume can be made smaller, but on the other hand, significant energy loss during transportation leads to an increase in transportation costs. These transportation and storage costs, which stem from the inherent properties of hydrogen, are significant, and present a problem that must be solved in order to enable widespread adoption of fuel cell vehicles.

If it were possible to install both a hydrogen production device and a fuel cell in a vehicle so that a required amount of hydrogen can be produced onboard the vehicle and supplied to the fuel cell, the hydrogen tank could be made very small, or omitted entirely. However, a fuel cell vehicle capable of travelling continuously using only hydrogen produced by a hydrogen production device installed in the vehicle is not yet known.

When installing a hydrogen production device in a transportation device that uses a fuel cell as a power source, there is a need for an efficient method for controlling the power generation amount of the fuel cell. Patent Documents 1 to 3 shown below disclose techniques for controlling a power generation amount. Patent Document 1 discloses an electric vehicle equipped with both a fuel cell and a storage battery which is a secondary battery as a power supply, wherein the fuel of the fuel cell is used as a heat exchange medium for a cooling unit that cools the vehicle interior. Specific fuel types include methanol, dimethyl ether, and butane.

Patent Document 2 discloses a combined system applicable to an electric vehicle, including a fuel cell, a heat exchanger for a cooling unit, a tank with a built-in hydrogen storage alloy for supplying hydrogen as fuel to the fuel cell and which incorporates a heat medium conduit of the cooling unit therein to perform heat exchange with a heat medium, a secondary battery connected in parallel between output terminals of the fuel cell, and a controller. When the output of the fuel cell is too high, the controller charges the secondary battery, and when the output of the fuel cell is insufficient, the controller causes the secondary battery to discharge, thereby controlling driving power for the motor and cooling output of the heat exchanger simultaneously.

Patent Document 3 discloses a control device of a generator for an electric vehicle, the control device being installed in a vehicle in which driving power can be supplied to a motor for driving the vehicle from the generator and a battery, and the battery can be charged by the generator, the control device including means for controlling output of the generator according to a power generation target, means for predicting the travel route of the vehicle before controlling, and means for setting the power generation target based on the predicted travel route. The control device of Patent Document 3 further discloses technology for predicting the required power depending on the driver's personal driving traits.

PRIOR ART DOCUMENTS

Patent Document 1: Japanese Unexamined Patent Application Publication No: 1993-260612
Patent Document 2: Japanese Unexamined Patent Application Publication No. 1995-99057
Patent Document 3: Japanese Unexamined Patent Application Publication No. 1997-98512

SUMMARY OF THE INVENTION

Problem to be Solved by the Invention

Conventionally, transportation devices using fuel cells as a power source used hydrogen suppled from the outside as fuel to travel. Since transporting and storing the hydrogen to be used as fuel came at a great cost, there was a demand for a transportation device that could reduce the amount of hydrogen to be transported and stored as much as possible by producing hydrogen in the transportation device.

The present invention was made with a view to resolving the aforementioned problem, and it is an object thereof to provide a transportation device capable of continuously travelling without being supplied with hydrogen from the outside.

Means for Solving the Problem

In order to resolve the aforementioned problem, the present invention provides a transportation device equipped with a hydrogen production device and a fuel cell. The transportation device according to the present invention includes an ammonia storage means, a hydrogen production device that decomposes ammonia to produce a hydrogen-containing gas, a fuel cell that uses hydrogen-containing gas supplied from the hydrogen production device to generate electric power, a motor that is supplied with part or all of the power generated by the fuel cell, a battery that is supplied with part or all of the power generated by the fuel cell and supplies power to the motor and the hydrogen production device, and a control unit that monitors a charge level of the battery and controls the power generation amount of the fuel cell. The control unit of the transportation device according to the present invention stores a threshold value of the charge level of the battery corresponding to a minimum amount of power required to start up the hydrogen production device, a function of the hydrogen production amount relative to power consumption of the hydrogen production device, and a function of output power relative to hydrogen consumption of the fuel cell. The transportation device according to the present invention is characterized in that on start-up, the hydrogen production device starts up by being supplied with power from the battery.

The transportation device according to the present invention is characterized in that the output power of the fuel cell is greater than the power consumption of the hydrogen production device.

The transportation device according to the present invention is characterized in that the operating temperature of the fuel cell is equal to or higher than the operating temperature of the hydrogen production device.

The transportation device according to the present invention includes a plasma reactor having an ammonia supply port and a hydrogen discharge port for decomposing ammonia and transform it into plasma, a power supply for plasma generation connected to a battery, and a hydrogen separation membrane that demarcates a hydrogen discharge port side of the plasma reactor. The hydrogen production device according to the present invention is characterized in that the hydrogen separation membrane separates hydrogen from the ammonia turned into plasma in the plasma reactor and allows the hydrogen to pass into the hydrogen discharge port side.

The transportation device according to the present invention further includes a high-voltage electrode connected to the power supply for plasma generation, and is characterized in that the hydrogen membrane is grounded, whereby the hydrogen separation membrane causes an electric discharge between the hydrogen separation membrane and the high-voltage electrode to turn the ammonia into plasma.

The transportation device according to the present invention is characterized in that it further includes an air conditioner that uses ammonia as a coolant.

The present invention further provides a control method for a transportation device. The transportation device according to the present invention includes an ammonia storage means, a hydrogen production device that decomposes ammonia introduced from the ammonia storage means by plasma discharge to produce a hydrogen-containing gas, a fuel cell that uses hydrogen-containing gas supplied from the hydrogen production device to generate electric power, a motor that is supplied with part or all of the power generated by the fuel cell, a battery that is supplied with part or all of the power generated by the fuel cell and supplies power to the motor and the hydrogen production device, and a control unit that stores a threshold value of the charge level of the battery corresponding to a minimum amount of power required to start up the hydrogen production device, a function of the hydrogen production amount relative to power consumption of the hydrogen production device, and a function of output power relative to hydrogen consumption of the fuel cell, and monitors a charge level of the battery and controls the power generation amount of the fuel cell.

The control method according to the present invention is characterized in that it includes a step of the control unit monitoring the charge level of the battery, a step of the control unit increasing the power supplied from the battery to the hydrogen production device when the charge level of the battery is lower than the threshold value, and a step of the control unit increasing the power supplied from the battery to the motor when a command to raise the number of revolutions of the motor has been received from the outside.

Effects of the Invention

The transportation device according to the present invention is equipped with a hydrogen production device and a fuel cell, wherein the hydrogen production device is capable of generating a sufficient amount of hydrogen-containing gas to operate the transportation device using power generated by the fuel cell and stored in the battery. As a result, the transportation device according to the present invention does not need a high-pressure hydrogen tank.

The fuel cell of the transportation device according to the present invention is capable of generating sufficient power both to run the transportation device and to operate the hydrogen production device. The hydrogen production device is capable of steady operation and the fuel cell is capable of continuous power generation. In other words, the transportation device according to the present invention is capable of autonomous operation.

In the transportation device according to the present invention, the motor is supplied with power from both the fuel cell and the battery. Even if the operating conditions of the motor change drastically, it is possible to supply the required power from the battery, which allows for swift adjustment to changing operating conditions without any response delays. For example, even in a case where a sudden acceleration of the transportation device drastically changes the output of the motor, it is possible to keep up with the increase in required energy.

In the transportation device according to the present invention, the operating temperature of the fuel cell is equal to or higher than the operating temperature of the hydrogen production device. Because of this, there is no need for a cooling means for the hydrogen-containing gas supplied from the hydrogen production device. This reduces power consumption, and makes it easier to install the hydrogen production device and the fuel cell in the limited space inside the transportation vehicle.

By constituting the hydrogen production device of the transportation device according to the present invention of a plasma reactor, a power supply for plasma generation, and a hydrogen separation unit, raw material containing hydrogen can be turned into plasma at room temperature under atmospheric pressure by causing an electric discharge between the hydrogen separation membrane and the high-voltage electrode to thereby produce a hydrogen-containing gas. Since the hydrogen production device according to the present invention is a plasma hydrogen production device that can operate at room temperature under atmospheric pressure, there is no need for a heating means that would be required in other types of hydrogen production devices, which makes the construction of the system as a whole simpler, and at the same time enables operation using less energy.

The transportation device according to the present invention is capable of easily and efficiently controlling power generation of the fuel cell by adjusting the hydrogen production amount in response to the charging state of the battery.

The hydrogen production device of the transportation device according to the present invention is capable of improving overall thermal efficiency, as it includes an air conditioner that uses ammonia as a coolant.

DESCRIPTION OF THE EMBODIMENTS

Figure 1:
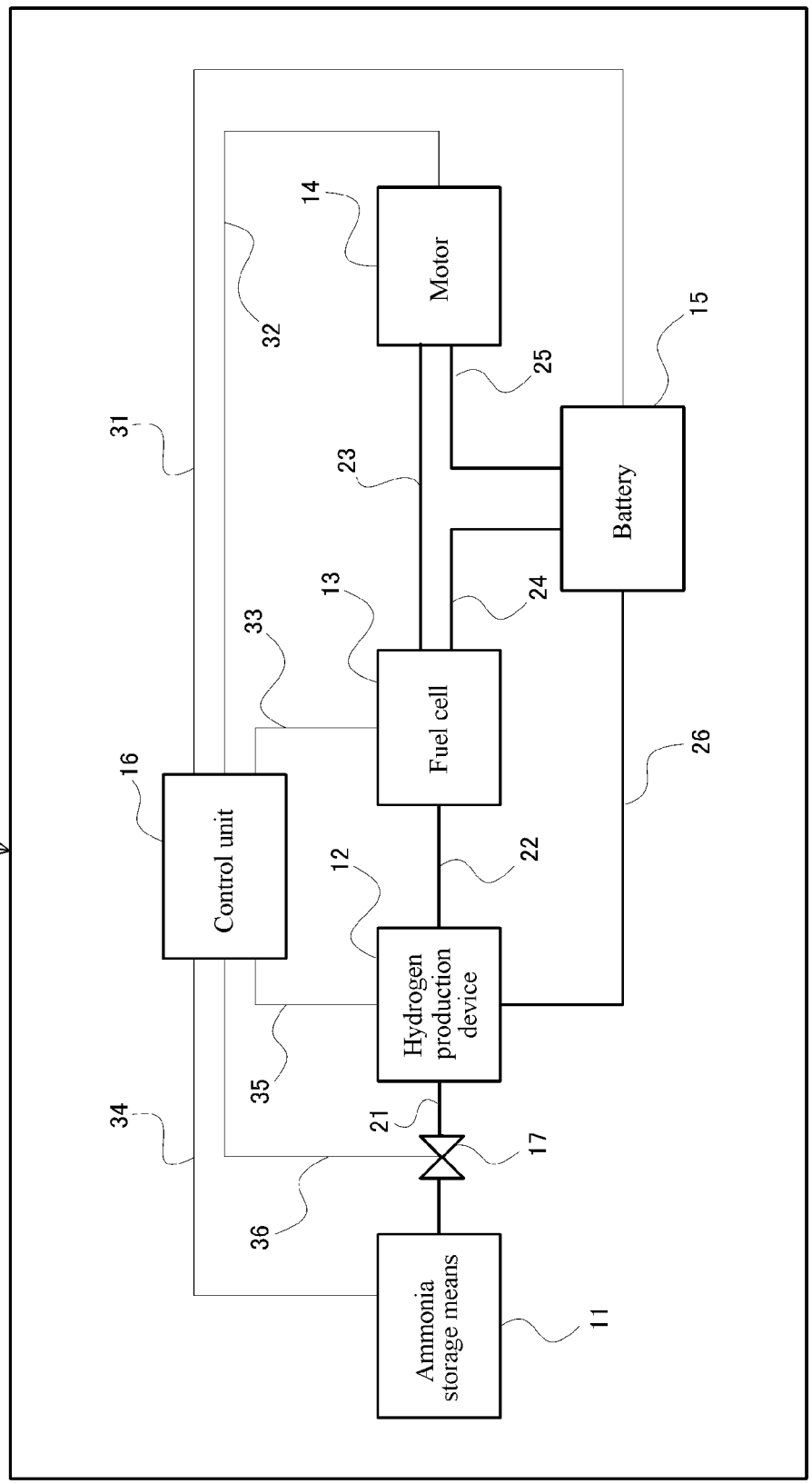
FIG. 1 is a block diagram showing the configuration of the transportation device according to an embodiment of the present invention.

Below is an itemized description of a preferred embodiment of the present invention.
(1) The term "transportation device" as used in the present invention means a device such as an automobile, a forklift, a ship, a motorcycle, or an airplane, equipped with a power source and capable of autonomous operation, or to a device such as an elevator or a conveyor belt.
(2) The term "fuel cell system" as used in the present invention means a system that is supplied with ammonia and which provides electric power. The fuel cell system includes a hydrogen production device, a fuel cell, and a battery (storage battery).
(3) The term "hydrogen production device" as used in the present invention means a device that produces hydrogen using ammonia as the raw material. The most preferred aspect of the hydrogen production device is a plasma hydrogen production device which includes a plasma reactor, a power supply for plasma generation, a high-voltage electrode, and a hydrogen separation unit that functions as a grounding electrode, wherein the device transforms ammonia into plasma by causing an electric discharge between the high-voltage electrode and the hydrogen separation unit, and only allows hydrogen to pass through the hydrogen separation unit to separate the hydrogen.
(4) As a hydrogen production device that meets the criteria for a plasma hydrogen production device, it is possible to apply a hydrogen production device that decomposes ammonia using a catalyst to extract hydrogen, and a hydrogen production device that combines a plasma reaction and a catalytic reaction.
(5) The hydrogen-containing gas produced by the plasma hydrogen production device has a hydrogen concentration of 99.99% or higher due to the hydrogen separation membrane.
(6) On start-up of the transportation device, the control unit performs the following control operations:
Controls the flow of ammonia introduced from the ammonia storage means.
Controls the amount of supplied power from the battery to the hydrogen production device for starting up the hydrogen production device. Further, sets the frequency and voltage of the power supply for plasma generation of the hydrogen production device to control the plasma power consumption of the plasma reactor, and controls the production amount of hydrogen.
Supplies power from the fuel cell to the motor.
Checks the charge level of the battery, and when the charge level is lower than a stored threshold value, increases power supplied to the hydrogen production device to increase plasma power consumption of the plasma reactor.
Continues charging until the charge level of the battery reaches the threshold value.
(7) Upon receiving a request to supply power to the motor that temporarily exceeds the power generation amount of the fuel cell system in operation, the controller performs the following control operations.
Increases power supplied from the battery to the motor. In other words, supplies power from the battery to the motor.
Increases flow of ammonia introduced from the ammonia storage means.
Increases the amount of power supplied from the battery to the hydrogen production device for starting up the hydrogen production device. Further, resets the frequency and voltage of the power supply for plasma generation of the hydrogen production device to increase plasma power consumption, and increases the production amount of hydrogen.
Increases power supped from the fuel cell to the motor.
Checks the charge level of the battery, and when the charge level is lower than a stored threshold value, increases power supplied to the hydrogen production device to increase plasma power consumption of the plasma reactor and increase the production amount of hydrogen.
Performs charging until the charge level of the battery reaches the threshold value.
(8) The most preferred fuel cell used as the fuel cell according to the present invention is a solid polymer fuel cell. Other types of fuel cells are also applicable.
(9) Connected to the power supply circuit that connects the fuel cell system and the motor according to the present invention are an inverter which converts the DC output voltage of the fuel cell and the battery into AC, and a power converter such as a DC/DC converter for stepping up the DC voltage of the fuel cell and the battery.

A preferred embodiment of the transportation device according to the present invention is described below with reference to the drawings.

Figure 2:
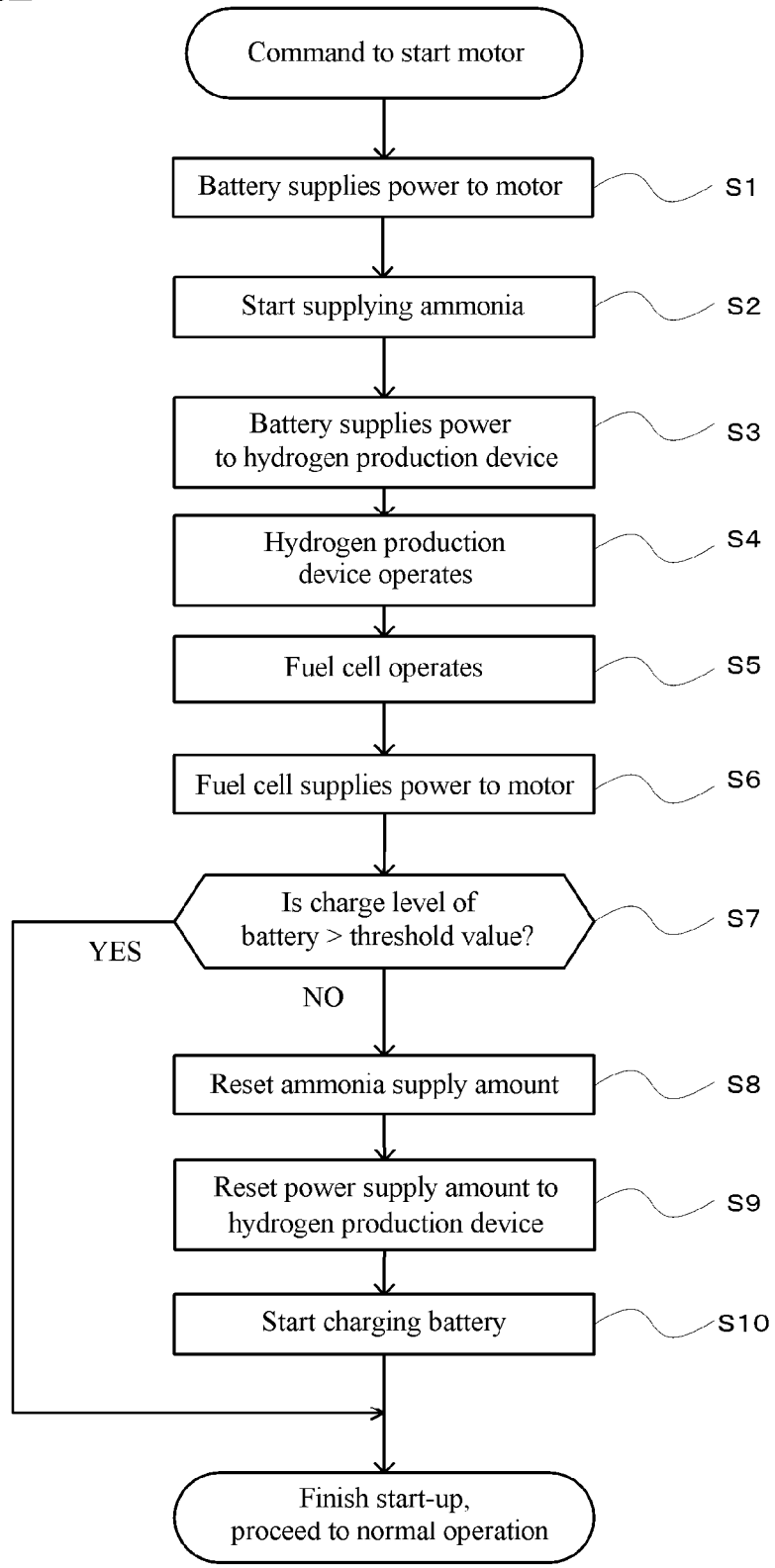
FIG. 2 is a flowchart showing a start-up sequence of the transportation device according to an embodiment of the present invention.
Figure 3:
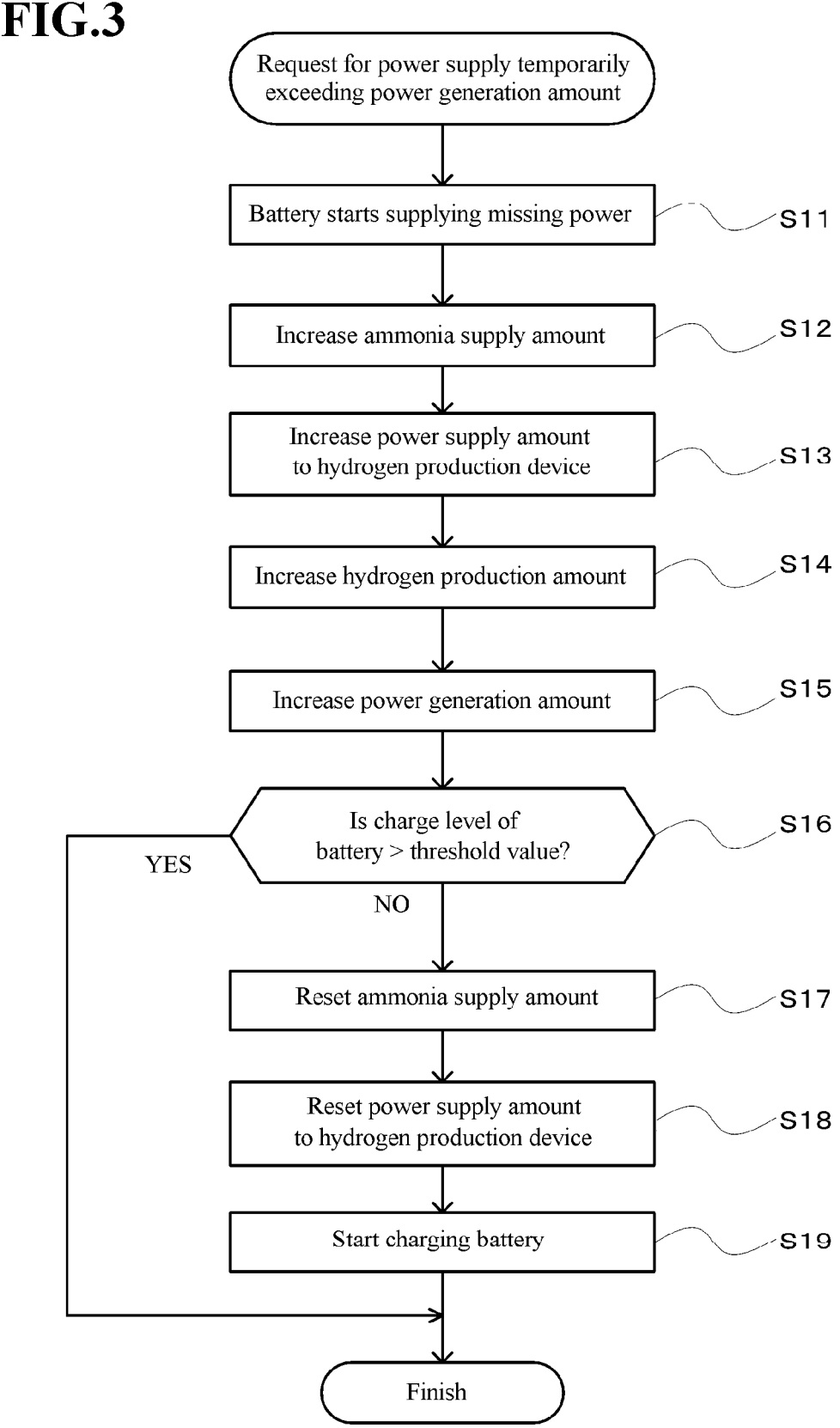
FIG. 3 is a flowchart showing a sequence for changing the operating conditions of the transportation device according to an embodiment of the present invention.

Referring to FIGS. 1 to 3, the transportation device and its method of operation will now be described. A transportation device 1 shown in FIG. 1 includes an ammonia storage means 11 in the form of a tank, a hydrogen production device 12, a fuel cell 13, a motor 14, a battery 15, and a control unit 16.

The control unit 16 is communicably connected respectively to the ammonia storage means 11, the hydrogen production device 12, the fuel cell 13, the motor 14, the battery 15, and an on-off valve 17 via control wires 31, 32, 33, 34, 35, 36. The control unit 16 stores a threshold value of the charge level of the battery 15 corresponding to a minimum amount of power required to start up the hydrogen production device 12, a function of the hydrogen production amount relative to power consumption of the hydrogen production device 12, and a function of output power relative to hydrogen consumption of the fuel cell 13.

The ammonia storage means 11 and the hydrogen production device 12 are connected by an ammonia intake path 21, which is provided with the on-off valve 17, whereby flow of ammonia to be introduced into the hydrogen production device 12 can be controlled. The on-off valve 17 is preferably a solenoid valve. The control unit 16 controls a degree of opening of the on-off valve 17 to control the amount of ammonia introduced, and thereby controls the production amount of hydrogen-containing gas of the hydrogen production device 12.

The hydrogen production device 12 produces hydrogen-containing gas by decomposing a predetermined amount of ammonia introduced through the ammonia intake path 21. Immediately after the produced hydrogen-containing gas is introduced into the fuel cell from a hydrogen supply path 22, power generation begins.

The fuel cell 13 generates power using the hydrogen-containing gas supplied from the hydrogen production device 12 and oxygen in air supplied by a fan not shown here. A solid polymer fuel cell with an operating temperature of 100° C. or lower is most preferably used as the fuel cell 13. Connected to the fuel cell 13 are a first power supply path 23 that supplies part or all of the generated power to the motor 14 and a second power supply path 24 that supplies part of all of the generated power to the battery 15. The control unit 16 monitors the power generation amount of the fuel cell 13 via the control wire 33 and commands the fuel cell 13 to supply an amount of power to the first power supply path 23 and to supply an amount of power to the second power supply path 24.

The second power supply path 24 which receives a supply of power from the fuel cell 13 is connected to the battery 15. Additionally, connected to the battery 15 are a third power supply path 25 that supplies power to the motor 14 and a fourth power supply path 26 that supplies power to the hydrogen production device 12. The control unit 16 monitors the charge level of the battery 15 via the control wire 31, and commands the battery 15 to supply an amount of power to the motor via the third power supply path 25 and to supply an amount of power to the hydrogen production device 12 via the fourth power supply path 26. Connected to the first to fourth power supply paths are electric power converters not shown here, such as inverters and DC/DC converters.

During normal operation, the control unit 16, in addition to performing control for obtaining a required power generation amount, also performs control to constantly keep the battery 15 charged to or above the threshold value. The control unit 16 constantly inputs the charge level of the battery 15 and compares it to the stored threshold value. If it is determined by the result of the comparison that the charge level has temporarily fallen below the threshold value, the control unit 16 controls the on-off valve 17 to increase the ammonia supply to the hydrogen production device 12 in order to increase the production amount of hydrogen-containing gas, and increases the amount of power supplied from the battery 15 to the hydrogen production device 12. The amount of hydrogen-containing gas produced by the hydrogen production device 12 thus increases rapidly, which in turn increases the power generation amount of the fuel cell 13, and the charge level of the battery 16 is restored. This sequence of operations temporarily reduces the charge level of the battery 15 since the amount of power supplied to the hydrogen production device 12 is increased, but since the power generation amount of the fuel cell 13 and the amount of power supplied to the battery 16 quickly exceeds the amount of power supplied from the battery to the hydrogen production device 12, the charge level of the battery 16 is quickly restored.

The method for starting up the transportation device 1 is described below with reference to FIG. 2. Start-up is initiated by a command to start up the motor 14 being input to the control unit 16. The control unit 16 causes the battery 15 to supply power to the motor 14 (Step S1), and at the same time initiates power generation. The on-off valve 17 between the ammonia storage means 11 and the hydrogen production device 12 is opened and ammonia is supplied to the hydrogen production device 12 (Step S2). The control unit 16 initiates supply of power from the battery 15 to the hydrogen production device 12 (Step S3), and the hydrogen production device 12 begins to operate and produce hydrogen (Step S4). Supplied with hydrogen from the hydrogen production device 12, the fuel cell 13 starts up and begins to generate power (Step S5), and power is supplied from the fuel cell 13 to the motor (Step S6). Here, the control unit 16 checks whether or not the charge level of the battery 15 is equal to or less than the threshold value (Step S7). If the charge level is equal to or less than the threshold value, the control unit 16 performs the following controls. In addition to the power generation amount required to operate the motor 14 and the hydrogen production device 12, the control unit 16 identifies a power generation amount required to charge the battery 15, and calculates the hydrogen production amount necessary to generate all the power. The control unit 16 then calculates a power supply amount and ammonia supply amount for the hydrogen production device 12 corresponding to the calculated hydrogen production amount, and resets the ammonia supply amount (Step S8), resets the power supply amount to the hydrogen production device (Step S9), and initiates charging of the battery 15 (Step S10). The above sequence of controls concludes start-up of the transportation device and initiates normal operation.

The method for changing the operating conditions of the transportation device 1 during normal operation is described below with reference to FIG. 3. In this example, a request for a power supply that temporarily exceeds the power generation amount of the fuel cell 13 has been input. The control unit 16 supplies a missing supply of power from the battery 15 (Step S11), and then increases the degree of opening of the on-off valve 17 between the ammonia storage means 11 and the hydrogen production device 12 to increase the ammonia supply amount (Step S12). The power supply amount from the battery 15 to the hydrogen production device 12 is increased (Step S13), which increases the hydrogen production amount (Step S14). The hydrogen supplied from the hydrogen production device 12 increases the power generation amount of the fuel cell 13 (Step S15). The control unit 16 checks whether or not the charge level of the battery 15 is equal to or higher than the threshold value (Step S16). If the charge level is equal to or less than the threshold value, the control unit 16 performs the following controls, similarly to when starting up. Specifically, in addition to the power generation amount for driving the motor 14, the control unit 16 identifies a power generation amount required to charge the battery 15, and calculates the hydrogen production amount necessary to generate the power. The control unit 16 then calculates a power supply amount and ammonia supply amount for the hydrogen production device 12 corresponding to the calculated hydrogen production amount, and resets the ammonia supply amount (Step S17), resets the power supply amount to the hydrogen production device (Step S18), and initiates charging of the battery 15. The above sequence of controls allows for swift adaptation to the operating conditions of the transportation device, while providing sufficient charging of the battery 15.

Figure 4:
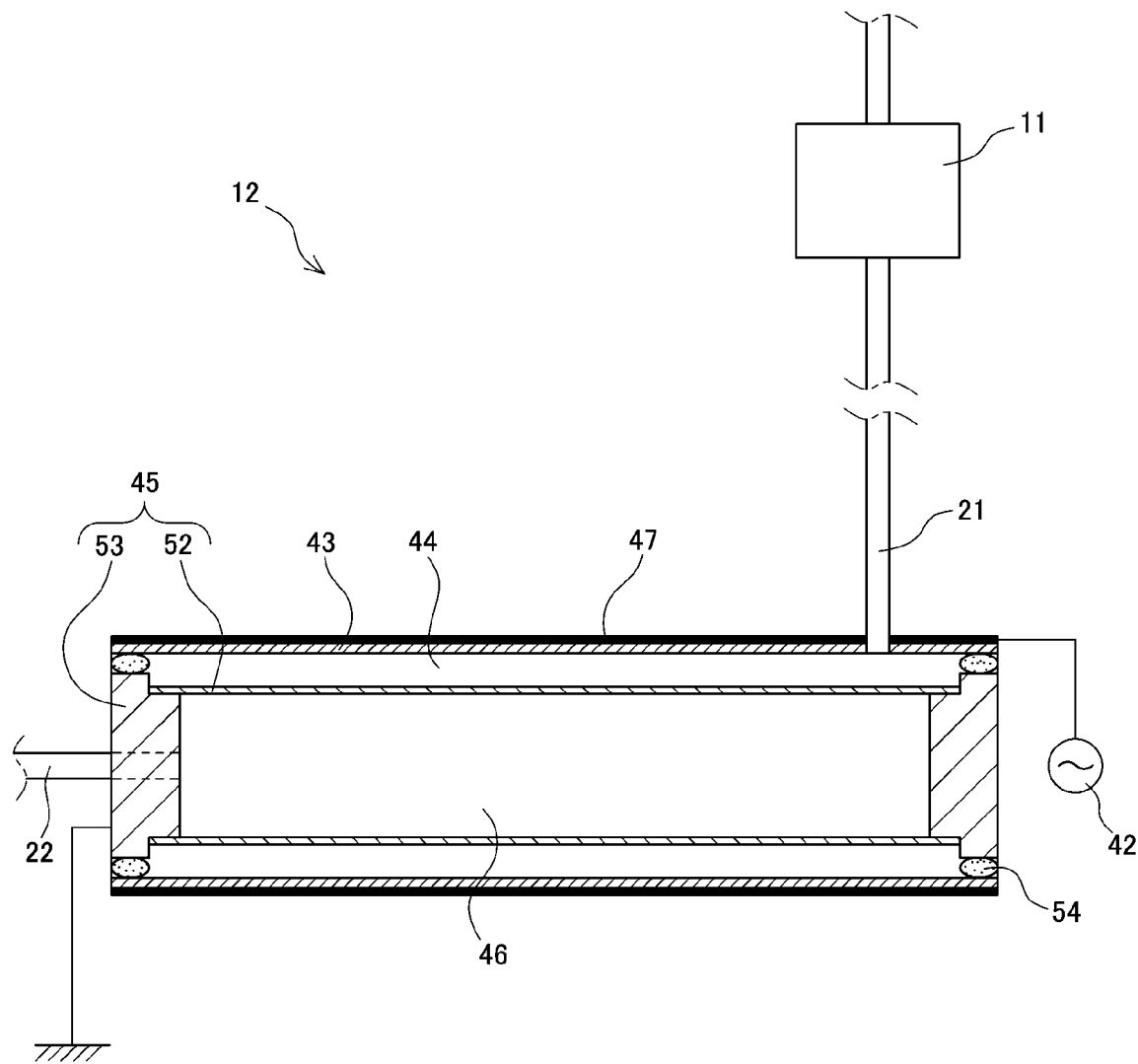
FIG. 4 is a schematic view of a vertical cross-section of the hydrogen production device according to an embodiment of the present invention.

A hydrogen production device 12 that is preferably used in the present embodiment is described with reference to FIG. 4. The hydrogen production device 12 is a plasma hydrogen production device including a plasma reactor 43, a grounding electrode 45 housed within the plasma reactor 43, and a high-voltage electrode 47 arranged on the outside of the plasma reactor 43. The plasma reactor 43 is made of quartz glass and is formed in a cylindrical shape. The grounding electrode 45 includes a cylindrical hydrogen separation membrane 52 and disc-shaped supports 53 that support both ends of the hydrogen separation membrane 52. A palladium alloy film is a preferred material of the hydrogen separation membrane 52.

The high-voltage electrode 47 is connected to a power supply for plasma generation 42 which is connected to the battery 15 via the fourth power supply path 26, and is provided with a high voltage. O-rings 54 are fitted between the plasma reactor 43 and the supports 53 such that the hydrogen separation membrane 52 is arranged concentrically with the inner wall of the plasma reactor 43. As a result, a discharge space 44 in which a constant distance is maintained is formed between the inner wall of the plasma reactor 43 and the hydrogen separation membrane 52. In addition, on the inside of the hydrogen separation membrane 52, there is formed a sealed internal chamber 46 enclosed by the hydrogen separation membrane 52 and the supports 53. The high-voltage electrode 47 is arranged concentrically with the plasma reactor 43 and the hydrogen separation membrane 52. The ammonia gas introduced from the ammonia storage means 11 via the ammonia intake path 21 is supplied to the discharge space 44 in the plasma reactor 43 of the hydrogen production device 12.

The hydrogen separation membrane 52 and the high-voltage electrode 47 face each other, and the plasma reactor 43 made of quartz is arranged between them, so that the plasma reactor 43 acts as a dielectric, which allows for a dielectric barrier discharge to be generated between the high-voltage electrode 47 and the hydrogen separation membrane 52 by applying a high voltage to the high-voltage electrode 47. The power supply for plasma generation 42 that applies the high voltage to the high-voltage electrode 47 can apply a voltage with an extremely short retention time of 10 μs. By controlling the voltage and frequency applied to the high-voltage electrode 47, it is possible to control the plasma power consumption of the plasma reactor.

Production of hydrogen using the hydrogen production device 12 is carried out by supplying ammonia gas to the discharge space 44 at a predetermined flow rate, generating a dielectric barrier discharge between the hydrogen separation membrane 52 acting as the grounding electrode and the high-voltage electrode 47, and generating atmospheric pressure non-equilibrium plasma of ammonia in the discharge space 44. The hydrogen generated from the atmospheric pressure non-equilibrium plasma of ammonia is adsorbed by the hydrogen separation membrane 52 in the form of hydrogen atoms, which scatter as they pass through the hydrogen separation membrane 52, after which they recombine into hydrogen molecules and move into the internal chamber 46. In this way only the hydrogen is separated. The hydrogen production device 12 is capable of producing 0.193 kg of hydrogen from 1 kg of ammonia.

The hydrogen production device 12 described herein operates at room temperature and atmospheric pressure. When ammonia is used, approximately 100% of the hydrogen contained in the ammonia can be separated and introduced into the internal chamber 46. As a result, the obtained hydrogen-containing gas is a high-purity hydrogen gas with a hydrogen concentration of 99.9% or more.

An example of the transportation device 1 according to the present invention embodied as a fuel cell vehicle is described below. The fuel cell vehicle according to the present example is equipped with a fuel cell 13 capable of generating 22.4 kWh from 1 kg of hydrogen. The hydrogen production device 12 of the present example is a plasma hydrogen production device including a plasma reactor 43, a grounding electrode 45 housed within the plasma reactor 43 and functioning as a hydrogen separation membrane 52, and a high-voltage electrode 47 arranged in contact with the outside of the plasma reactor 43.

The ammonia storage means 11 installed in the fuel cell vehicle of the present example is made up of five ammonia tanks with a volume of 13 L ($13 \times 10^{-3}$ m$^3$). Each ammonia tank can store 5 kg of ammonia.

The relationship between the power consumption and the hydrogen production amount of the hydrogen production device 12 installed in the fuel cell vehicle of the present example is shown in Table 1 below. A function representing this relationship is stored in the control unit 16, and is used for controlling the hydrogen production amount. The hydrogen production device 12, when supplied with 1.39 liters of ammonia per minute (volume calculated based on standard conditions of 1 atm, 0° C.), is capable of producing hydrogen in proportion to the supplied power, for example 5.57 liters of hydrogen per minute with a power consumption of 100 W.

TABLE 1

| Plasma hydrogen production device power consumption (W) | Hydrogen production amount (L/min) |
| --- | --- |
| 37.5 | 2.09 |
| 75 | 4.18 |
| 150 | 8.35 |
| 225 | 12.53 |
| 300 | 16.70 |

In addition, an example of the relationship between the hydrogen supply amount and the amount of power generated by the solid polymer fuel cell constituting the fuel cell 13 applied in the present example is shown in Table 2 below. A function representing this relationship is stored in the control unit 16, and is used for controlling the power generation amount of the fuel cell.

TABLE 2

| Hydrogen supply amount (L/min) | Fuel cell power generation amount (Wh) |
| --- | --- |
| 2.09 | 250 |
| 4.18 | 500 |
| 8.35 | 1000 |
| 12.53 | 1500 |
| 16.70 | 2000 |

The control unit 16 stores the relationship between the power supply amount and output of the motor 14. As shown in FIG. 3, when responding to a request for increase in output of the motor 14, the control unit 16 performs the steps of supplying the required power from the battery 15 (Step S11 in FIG. 3), and increasing the power generation amount of the fuel cell 13 (Steps S12 to S15 in FIG. 3). Here the control unit 16 increases the power generation amount of the fuel cell 13 to an amount corresponding to both the output of the motor 14 and the increase in power supply amount to the hydrogen production device 12, thus keeping the temporarily reduced charge level of the battery 15 at or above the threshold value. The control unit 16 constantly monitors the charge level of the battery 15, and resets the ammonia supply amount and adjusts the power supply amount to the hydrogen production device in order to control the hydrogen production amount and thereby control the power generation amount efficiently.

Ammonia is a natural coolant that can handle a wide temperature range (from −50° C. to 90° C.) and has a high heat capacity per unit of power. Since natural coolants are naturally occurring substances that are not artificially created, their ozone depletion potential (ODP) is zero, and have a very low global warming potential (GWP) even compared to CFC substitutes. Ammonia is thus a suitable air conditioning coolant for transportation devices such as fuel cell vehicles that do not emit pollutants during operation.

Figure 5:
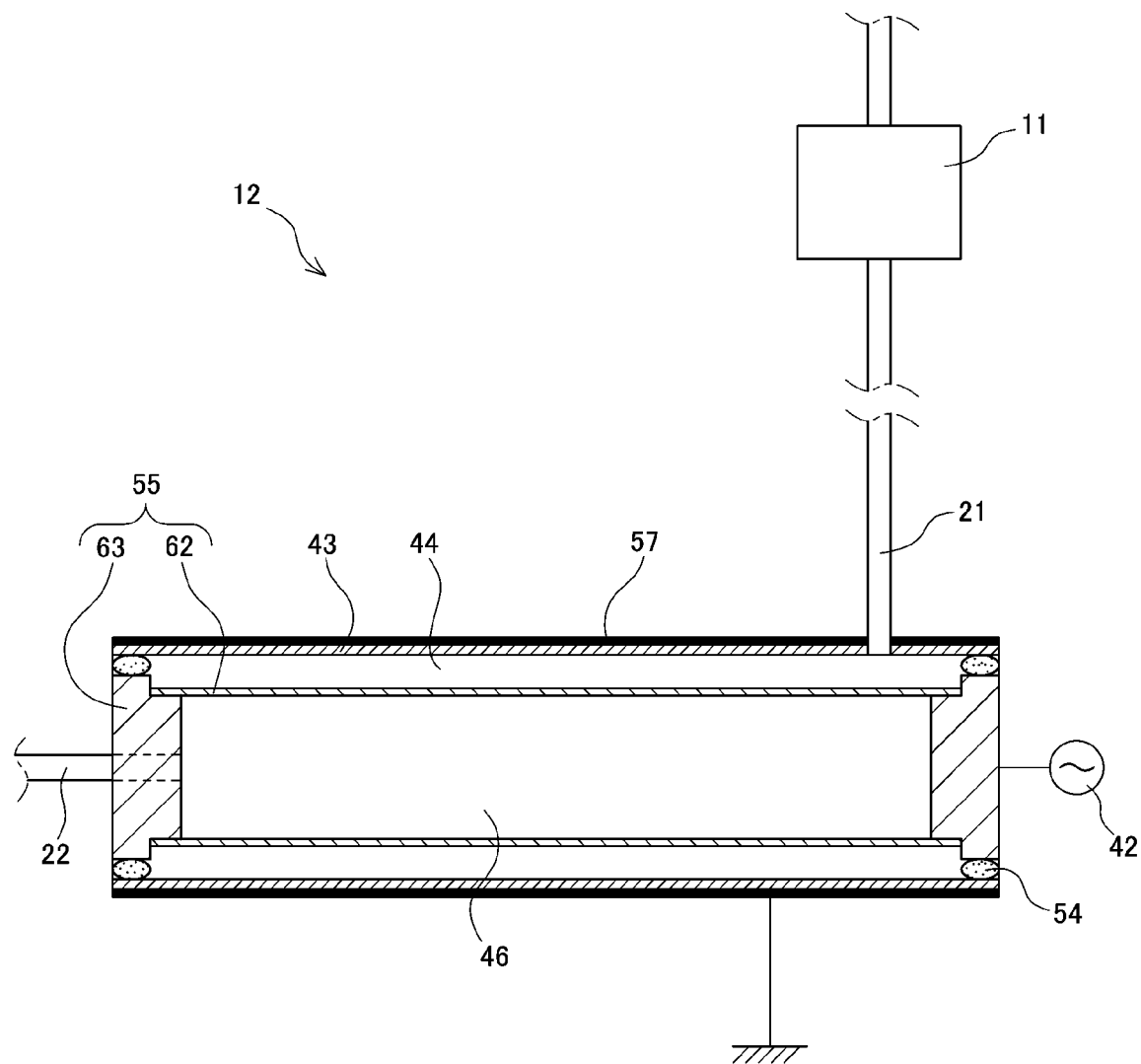
FIG. 5 is a schematic view of a vertical cross-section of the hydrogen production device according to another embodiment of the present invention.

The transportation device 1 and method of operating the same as described in the present example may be altered or varied. A variant hydrogen production deice 12 is shown in FIG. 5. In this variant, an electrode 55 housed within the plasma reactor 43 is connected to the power supply for plasma generation 42, constituting a high-voltage electrode 55. Accordingly, a cylindrical hydrogen separation membrane 62 and supports 63 that support the hydrogen separation membrane 62 function as a high-voltage electrode. An electrode 57 arranged in contact with the outside of the plasma reactor 43 is grounded and constitutes a grounding electrode 57. The hydrogen separation membrane 62 and the grounding electrode 57 cause a dielectric barrier discharge like in the previously described example, and the hydrogen separation membrane 62 is exposed to the plasma and can thus separate hydrogen.

As another example, the hydrogen production device can be composed of a tabular dielectric body having a flow path surface in which an ammonia flow path is formed as a groove with an opening, an electrode facing the backside of the dielectric body, and a hydrogen separation membrane arranged so as to close off the groove of the dielectric body. In a hydrogen production device in which such plates are combined, the fuel cell and the fuel electrode are arranged facing each other, which allows for hydrogen to be directly introduced into the fuel cell.

DESCRIPTION OF THE REFERENCE NUMERALS 1 transportation device
11 ammonia storage means (tank)
12 hydrogen production device
13 fuel cell
14 motor
15 battery
16 control unit
17 on-off valve
21 ammonia intake path
22 hydrogen supply path
23 first power supply path
24 second power supply path
25 third power supply path
26 fourth power supply path
31, 32, 33, 34, 35, 36 control wires
42 power supply for plasma generation
43 plasma reactor
45, 57 grounding electrode
47, 55 high-voltage electrode
52, 62 hydrogen separation membrane
53, 63 support

What is claimed is:

1. A transportation device comprising:
an ammonia storage means;
a hydrogen production device configured to produce a hydrogen-containing gas by decomposing ammonia;
a fuel cell configured to generate power using hydrogen-containing gas produced by the hydrogen production device;
a motor configured to be supplied with part or all of the power generated by the fuel cell;
a battery configured to be supplied with part or all of the power generated by the fuel cell and to supply power to the motor and the hydrogen production device; and
a control unit configured to monitor a charge level of the battery and control a power generation amount of the fuel cell,
wherein the control unit stores a threshold value of the charge level of the battery corresponding to a minimum amount of power required to start up the hydrogen production device, a function of the hydrogen production amount relative to power consumption of the hydrogen production device, and a function of output power relative to hydrogen consumption of the fuel cell, and
wherein on start-up the hydrogen production device is supplied with power from the battery to start up.

2. The transportation device according to claim 1, wherein the output power of the fuel cell is greater than the power consumption of the hydrogen production device.

3. The transportation device according to claim 1, wherein an operating temperature of the fuel cell is equal to or greater than an operating temperature of the hydrogen production device.

4. The transportation device according to claim 1, wherein the hydrogen production device comprises:
a plasma reactor for decomposing ammonia and transforming the ammonia into plasma, the plasma reactor having an ammonia supply port and a hydrogen discharge port;
a power supply for plasma generation connected to the battery; and
a hydrogen separation membrane that demarcates a hydrogen discharge port side of the plasma reactor,
wherein the hydrogen separation membrane is configured to separate hydrogen from ammonia transformed into plasma in the plasma reactor and pass the hydrogen through to the hydrogen discharge port side.

5. The transportation device according to claim 4, wherein the hydrogen production device further comprises a high-voltage electrode connected to the power supply for plasma generation,
wherein the hydrogen separation membrane is grounded, and
wherein the hydrogen separation membrane causes an electric discharge between the hydrogen separation membrane and the high-voltage electrode to transform ammonia into plasma.

6. The transportation device according to claim 1, further comprising an air conditioner that uses ammonia as a coolant.

7. A method for operating a transportation device, the transportation device comprising:
an ammonia storage means;

a hydrogen production device configured to produce a hydrogen-containing gas by decomposing ammonia introduced from the ammonia storage means by plasma discharge;

a fuel cell configured to generate power using hydrogen-containing gas produced by the hydrogen production device;

a motor configured to be supplied with part or all of the power generated by the fuel cell;

a battery configured to be supplied with part or all of the power generated by the fuel cell and to supply power to the motor and the hydrogen production device; and a control unit that stores a threshold value of the charge level of the battery corresponding to a minimum amount of power required to start up the hydrogen production device, a function of the hydrogen production amount relative to power consumption of the hydrogen production device, and a function of output power relative to hydrogen consumption of the fuel cell, the control unit configured to monitor a charge level of the battery and control a power generation amount of the fuel cell, the method comprising the following steps:

monitoring, by the control unit, the charge level of the battery;

when the charge level of the battery is less than the threshold value, increasing, by the control unit, the power supplied from the battery to the hydrogen production device; and upon receipt of a command from outside to increase a number of revolutions of the motor, increasing, by the control unit, the power supplied from the battery to the motor.

\* \* \* \* \*